(12) United States Patent
Nicole' et al.

(10) Patent No.: US 9,080,600 B2
(45) Date of Patent: Jul. 14, 2015

(54) ROTATING CONTROL ASSEMBLY WITH DOUBLE CABLE, WITH ADJUSTMENT OF THE CABLE TENSION

(71) Applicant: DENSO Thermal Systems S.p.A., Poirino (IT)

(72) Inventors: Fabrizio Nicole', Poirino (IT); Claudio Ferrarese, Poirino (IT); Andrea Carbone, Poirino (IT); Stefano Bonetti, Poirino (IT)

(73) Assignee: Denso Thermal Systems S.P.A., Poirino (Turin) (IT)

( * ) Notice: Subject to any disclaimer, the term of this patent is extended or adjusted under 35 U.S.C. 154(b) by 0 days.

(21) Appl. No.: 14/165,437

(22) Filed: Jan. 27, 2014

(65) Prior Publication Data

US 2014/0208885 A1   Jul. 31, 2014

(30) Foreign Application Priority Data

Jan. 29, 2013   (IT) .............................. TO2013A0069

(51) Int. Cl.

| F16C 1/10 | (2006.01) |
| F16C 1/18 | (2006.01) |
| F16C 1/22 | (2006.01) |

(52) U.S. Cl.
CPC ................ *F16C 1/106* (2013.01); *F16C 1/102* (2013.01); *F16C 1/18* (2013.01); *F16C 1/22* (2013.01); *Y10T 74/20402* (2015.01)

(58) Field of Classification Search
USPC .......... 74/10.7, 89.22, 500.5, 501.5 R, 501.6, 74/502.4, 502.6; 251/294
See application file for complete search history.

(56) References Cited

U.S. PATENT DOCUMENTS

| 3,747,428 A | * | 7/1973 | Waner et al. .................... 74/496 |
| 6,131,482 A | | 10/2000 | Klippert et al. |
| 2010/0192721 A1 | | 8/2010 | Goupil, Jr. et al. |

FOREIGN PATENT DOCUMENTS

| DE | 8702163 U1 | 7/1987 |
| EP | 1818550 | 8/2007 |
| EP | 2014490 | 1/2009 |
| JP | 2010158953 | 7/2010 |

OTHER PUBLICATIONS

EPO Search Report and Written Opinion dated Mar. 6, 2014, for European Application No. 14152758.0.
Italian Search Report and Written Opinion for Application No. TO2013A000069 dated Oct. 10, 2013.

* cited by examiner

*Primary Examiner* — Thomas Diaz
(74) *Attorney, Agent, or Firm* — Patterson & Sheridan, LLP

(57) ABSTRACT

Rotating control assembly with double cable, comprising a first and a second actuator device both having a respective rotating pulley and being connected together by two cables both fixed to the pulley of the first actuator device and to the pulley of the second actuator device, wherein the pulley of the first actuator device and the pulley of the second actuator device are identical to each other, each of the pulleys being mounted on a respective base, and wherein each actuator device comprises a guide part having a pair of resilient wings which press on respective sections of the cables in immediate proximity to areas where the cables are wound onto the respective pulley.

2 Claims, 4 Drawing Sheets

ROTATING CONTROL ASSEMBLY WITH DOUBLE CABLE, WITH ADJUSTMENT OF THE CABLE TENSION

BACKGROUND OF THE DISCLOSURE

1. Field of the Disclosure

The present invention relates to a rotating control assembly with double cable, comprising a first and a second actuator device both having a respective rotating pulley and being connected together by two cables both fixed to the pulley of the first actuator device and to the pulley of the second actuator device, wherein the pulley of the first actuator device and the pulley of the second actuator device are identical to each other, each of said pulleys being mounted on a respective base, and wherein each actuator device comprises a guide part having a pair of resilient wings which press on respective sections of the cables in immediate proximity to areas where the cables are wound onto the respective pulley.

An assembly of this type is described in the publication EP 2,014,490 in the name of the same Applicant.

2. Description of the Related Art

In the known assemblies, the tolerances occurring in respect of the free length of the Bowden cables used in them are the cause of variations in the torsional load transmitted as well as hysteresis affecting operation and the length of the cable itself. Moreover, the cable may become loose and come out of its seats; in this case the cable may lose its functional capacity.

SUMMARY OF THE DISCLOSURE

The present invention relates in particular to an assembly of the type defined initially in which each base comprises a guide mounting portion which extends from the base in a radial direction with respect to an axis of rotation of the pulley and to which the respective guide part is fixed, with respect to the radial direction, by means of a form-fit, force-fit and/or material coupling, said guide mounting portion being configured to define a plurality of radial positions for assembling the guide part.

One object of the present invention is to provide a rotating control assembly with double cable in which it is possible to adjust the cable tension so as to compensate for the tolerances of the Bowden cables.

This object is achieved according to the invention by an assembly of the type defined above, in which each guide part is fixed to the respective base by means of welding or by means of a locking ratchet, and said plurality of radial assembly positions is defined by an adjusting ratchet arranged between each guide part and the respective guide mounting portion.

In an assembly according to such a proposed solution, owing to the fact that the guide parts are separated from the respective bases, it is possible to ensure that they are mounted selectively at different distances from these bases such as to increase or decrease the geometrical path of the cable; the position of the guide parts may thus be chosen depending on the length of the free part of the cable. Once the guide part has been assembled on the respective base in the desired position it is envisaged that this position is maintained for the entire duration of the assembly by means of fixing together of the components.

The invention also relates to a method for adjusting the cable tension in a rotating control assembly with double cable, comprising the following steps:

providing a first and a second actuator device both having a respective rotating pulley and being connected together by two cables both fixed to the pulley of the first actuator device and to the pulley of the second actuator device, wherein the pulley of the first actuator device and the pulley of the second actuator device are identical to each other, each of said pulleys being mounted on a respective base, and wherein each base comprises a guide mounting portion extending from the base in a radial direction with respect to an axis of rotation of the pulley, and positioning, on each guide mounting portion, a respective guide part having a pair of resilient wings, in such a way that said resilient wings press on respective sections of the cables in immediate proximity to areas where the cables are wound onto the respective pulley, a final position of each guide part with respect to the respective guide mounting portion being fixed by means of a form-fit, force-fit and/or material coupling, wherein said step of positioning a respective guide part on each guide mounting portion comprises the following steps:

reading free length data relating to said pair of cables and indicating a length difference (L) between said cables and respective sheaths (102, 104), determining a radial assembly position of each guide part with respect to the respective mounting portion, depending on said free length data, and moving each guide part along the respective mounting portion so as to reach said radial assembly position, and wherein said step of reading free length data involves reading an identification code associate with said pair of cables and containing the free length data in coded form, and said step of determining the radial assembly position of each guide part is based on a transfer function which associates with said free length data in coded form corresponding values of the radial assembly position of each guide part.

Preferred embodiments of the invention are defined in the dependent claims which are to be understood as forming an integral part of the present description.

BRIEF DESCRIPTION OF THE DRAWINGS

Further characteristic features and advantages of the assembly according to the invention will become clear from the following detailed description of an embodiment of the invention provided with reference to the accompanying drawings and provided purely by way of a non-limiting example in which.

DETAILED DESCRIPTION

Figure 1:
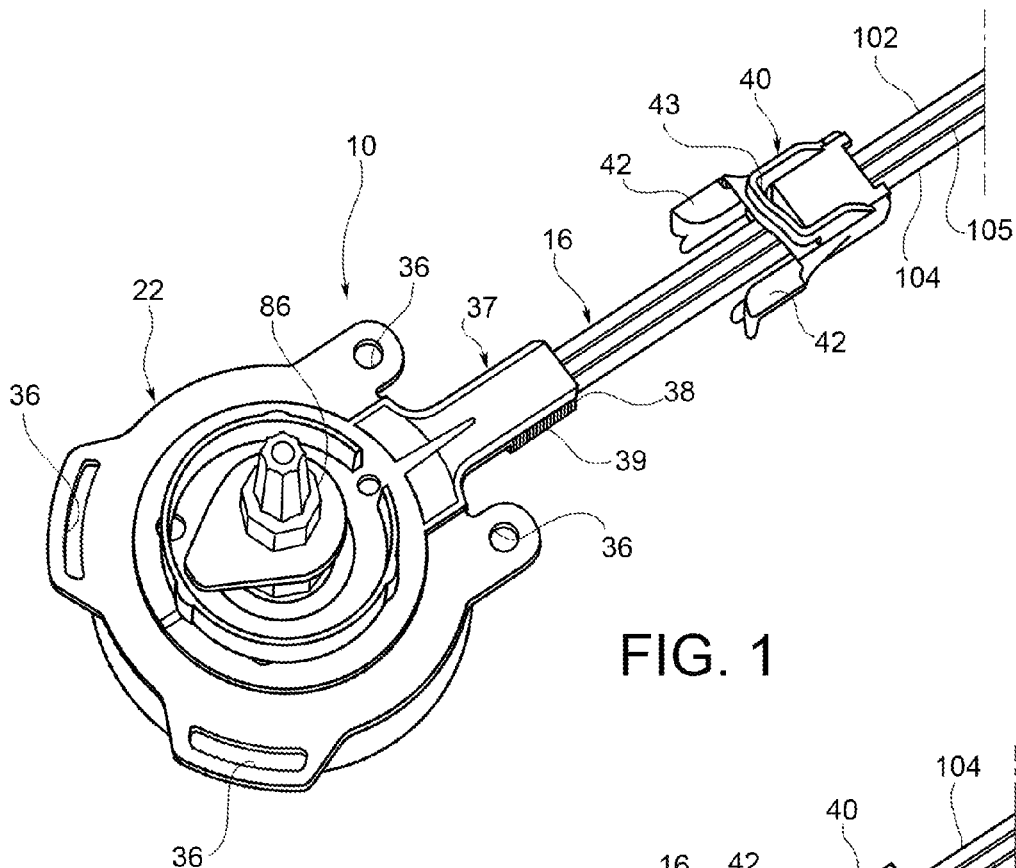
FIGS. 1 and 2 are perspective views, from opposite sides, of an actuator device of a control assembly according to the invention, before assembly together with a guide part.
Figure 2:
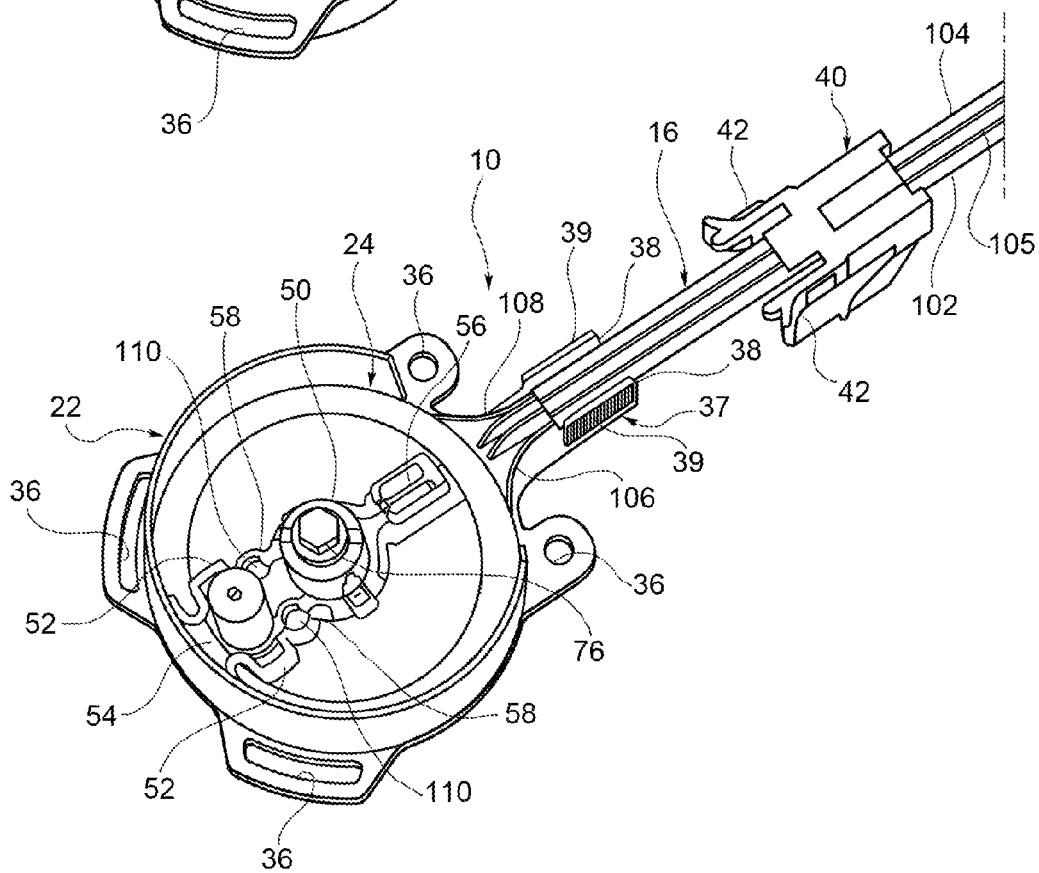

With reference to FIGS. 1 to 5, these figures show an actuator device of a rotating control assembly with double cable according to the present invention. The control assembly comprises such an actuator device, denoted by 10 in the figures, and a second actuator device (not shown) similar to the first device and connected thereto by means of a flexible transmission 16 comprising a double cable.

The first and second actuator devices are designed to be fixed to respective supports (not shown). For example, one of them could be fixed to a support arranged on the dashboard of a vehicle, while the other one could be fixed to the housing of an air processing and distribution assembly. The control assembly may be used for example to adjust the temperature of the air flow introduced into the vehicle compartment or select the output direction of the air flow (towards the feet, from the front vents or side vents, de-icing mode, etc.). The assembly may also be used to select the input direction of the air flow to be processed (recirculation mode or use of external air). Generally the control assembly may be used in all those applications where it is required to operate remotely a device by means of a rotating control.

The actuator device 10 comprises a base 22 and a pulley 24 mounted rotatably with respect to the base 22 about an axis 26. Preferably, both the base 22 and the pulley 24 are made of injection-moulded plastic. The base 22 has a front surface having, formed therein, a circular seat 30 in the centre of which a through-hole 34 is formed. The base 22 is provided with fixing eyelets and holes 36 which are preferably arranged in respective corners of the base 22, for fixing to external supports (not shown).

The base 22 also comprises a guide mounting portion 37 which extends radially from the base 22 and is formed integrally therewith. The guide mounting portion 37 has a pair of side walls 38 extending perpendicularly therefrom. Two racks 39 are formed on respective outer side surfaces of these side walls 38. The guide mounting portion 37 is used to mount a guide part 40 which will be described in detail below.

The pulley 24 comprises a circumferential groove (visible in FIG. 5) for winding the control cables. The pulley 24 has a front surface provided with central hub 50. Two projecting guides 52, arranged symmetrically with respect to a diametral axis of the pulley, are also formed on this front surface. The two guides 52 are open on the front side of the pulley and extend on opposite sides around the central hub 50. At a first end, the two guides 52 communicate with the circumferential groove of the pulley via an interruption zone 54. At the opposite end, the two guides 52 lead into a prism-shaped seat 56. The guides 52 also have respective fixing seats 58 formed by widened portions and with a circular profile of the guides 52. The two fixing seats 58 are located on the opposite side to the prism-shaped seat 56 relative to a diametral axis of the pulley 24. The pulley 24 is fastened axially with respect to the base 22 by means of a screw 76 which engages inside a hole 78 in the hub 50 and, on the side of the base 22, by means of operating element 86. This operating element 86 is thus rotationally locked together with the pulley 24.

The base and the pulley of the second actuator device (not shown) are identical to the base 22 and the pulley 24 of the first actuator device 10 described above. Depending on the different types of use, each of the actuator devices of the control assembly may be equipped with different operating elements 86, while leaving the base 22 and the pulley 24 unchanged.

As can be seen in the figures, the flexible transmission 16 comprises two parallel sheaths 102, 104 which are fixed together and inside which respective cables 106, 108 are slidably inserted. Between the two aforementioned sheaths 102, 104 a third sheath 105 is arranged, said sheath receiving, inserted therein, a fixed cable with the function of rigidifying the flexible transmission 16 and fixing over time the free length of the cable.

Figure 8:
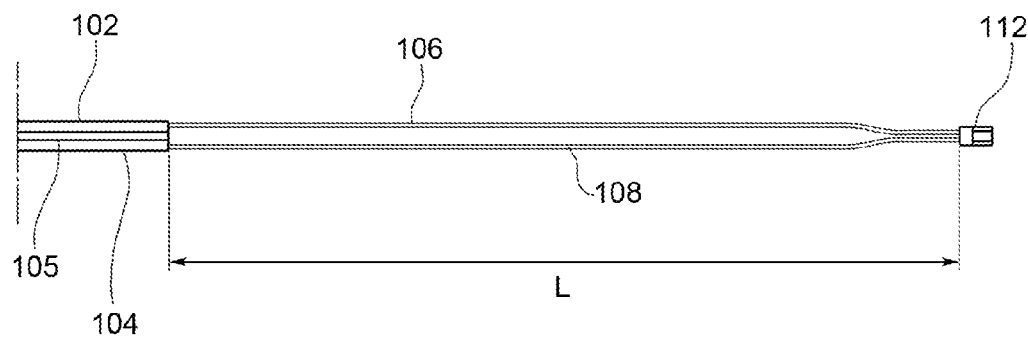
FIG. 8 is a plan view of a terminal part of a double Bowden cable.

The sliding cables 106, 108 are inserted inside the guide portions 40 of the bases 22 of the first and second actuator devices and are wound along respective sections of the circumferential grooves of the pulleys 24. Each cable 106, 108 has at a first end a stop element which engages inside a respective seat 58 of the pulley 24 of one of the actuator devices of the control assembly, for example that shown in the figures. The opposite ends of the two cables 106, 108 are both fixed to a single fixing member 112 (visible in FIG. 8) housed inside the seat 56 of the pulley 24 of the other one of the actuator devices of the control assembly. One end of the sheaths 102, 104, 105 of the flexible transmission 16 is fixed to each guide mounting portion 37 of the base 22. These sheaths 102, 104, 105 are arranged between the two side walls 38 of the guide mounting portion 37.

As already mentioned above, the guide mounting portion 37 of the base 22 is intended for mounting the guide part 40. This guide part 40 is provided with a pair of resiliently deformable wings 42 and a gripping portion 43 for allowing handling of the guide part 40 and assembly thereof on the base 22 on an automated assembly line.

In particular, the guide part 40 consists of a sleeve with a prism-shaped, in particular rectangular, cross-section inside which the cables 102, 104, 105 with the respective sheaths are inserted and at one end of which the resiliently deformable wings 42 are integrally formed on opposite sides of the sleeve. Teeth (not visible in the figures) are formed on respective opposite, inner, side surfaces of the guide part 40.

Figure 3:
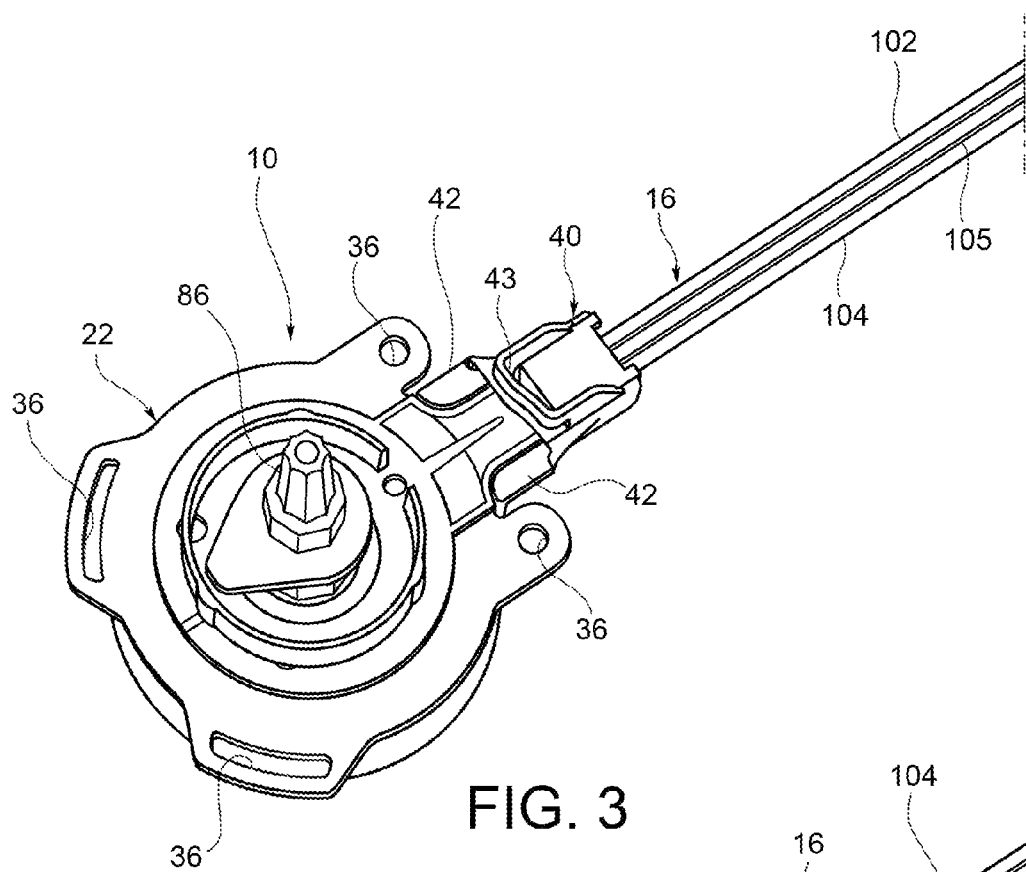
FIGS. 3 and 4 are perspective views, from opposite sides, of the actuator device according to FIG. 1 assembled together with the respective guide part.
Figure 4:
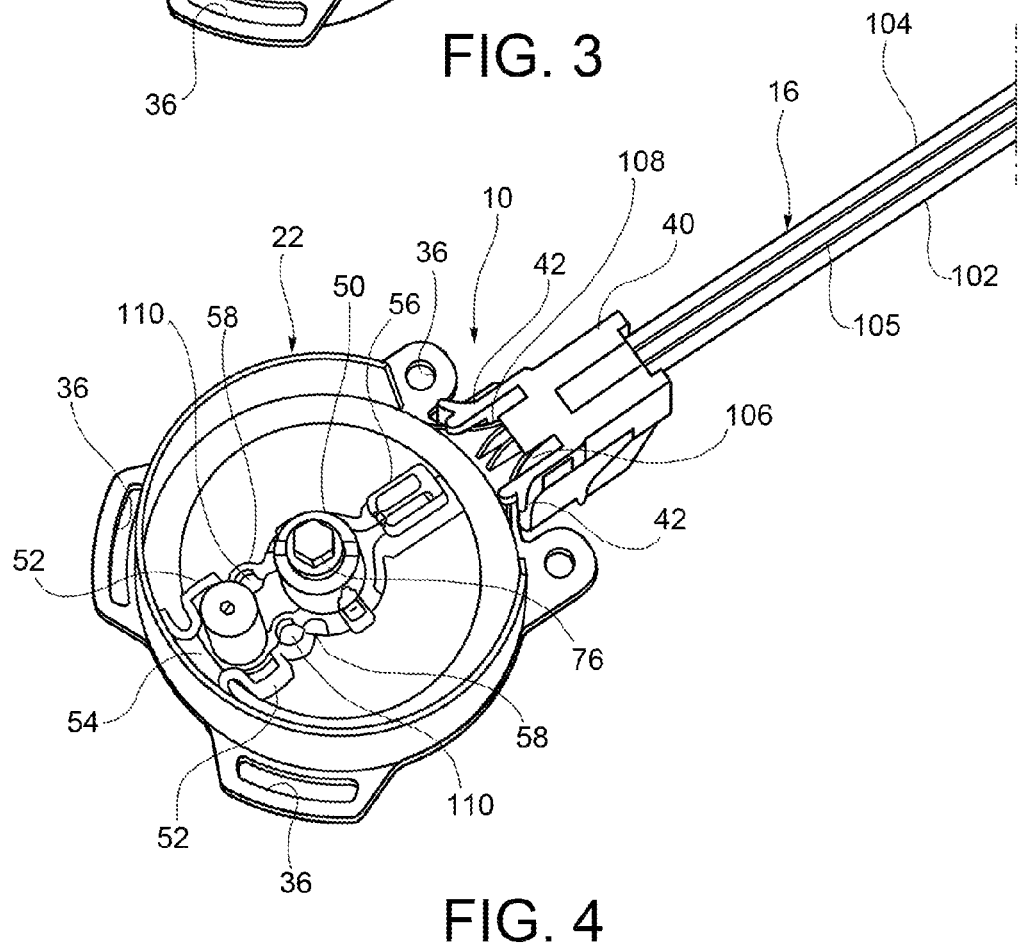
Figure 5:
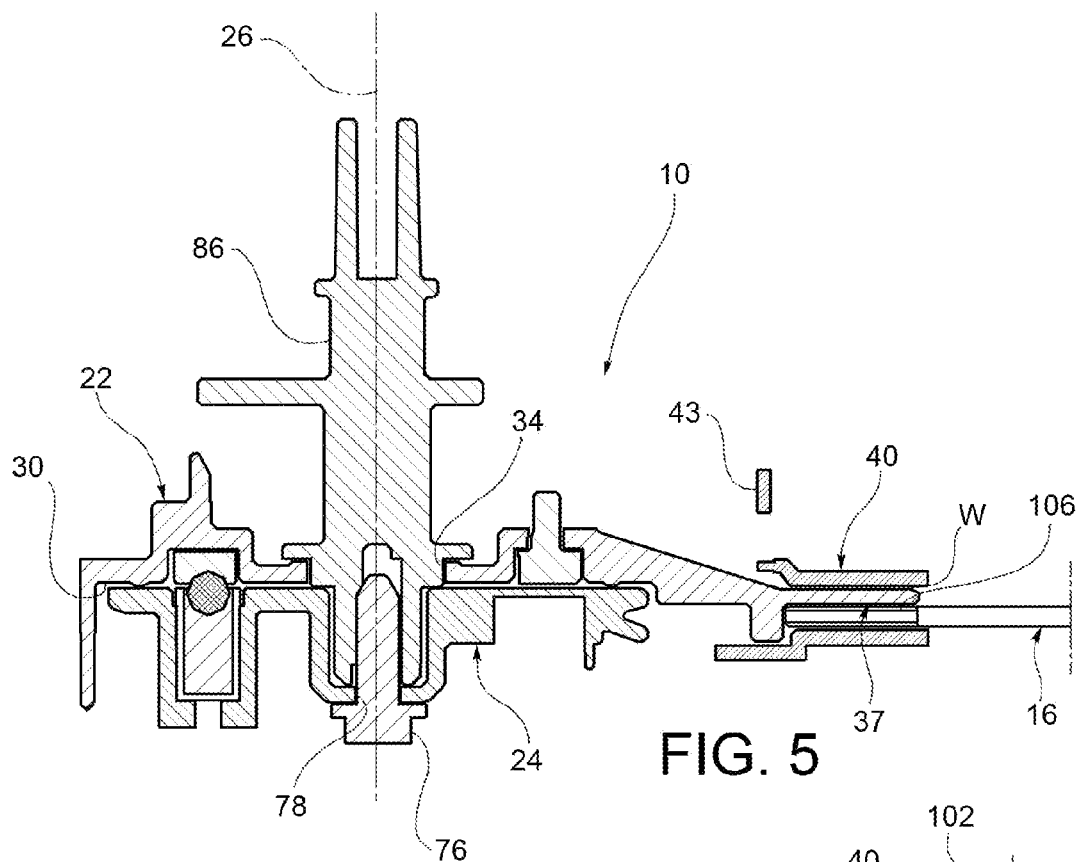
FIG. 5 is a cross-sectional view of the actuator device according to FIG. 1 assembled together with the guide part.

In the assembled condition shown in FIGS. 3 to 5, the resilient wings 42 of the guide part 40 press resiliently on the cables 106, 108 in immediate proximity to areas where the cables 106, 108 are wound onto the pulleys 24. Owing to the resilient force applied by the wings 42 to the cables 106, 108, the play of the flexible transmission 12 may be taken up.

During assembly, the guide part 40 is slidably fitted onto the guide mounting portion 37 of the base 22. Consequently, the racks 39 formed on the respective outer side surfaces of the side walls 38 of the guide mounting portion 37 are respectively engaged by the teeth formed on the inner side surfaces of the guide part 40. Owing to this arrangement, the guide part 40 may be assembled on the base 22 in a radially variable position with respect to the axis of rotation 26 of the pulley 24. The invention is, however, not limited to this arrangement, it being feasible to use other means able to ensure variable positioning of the guide part 40 with respect to the base 22.

The guide part 40 therefore forms a part separate from the respective base 22 and is fixed to it by means of a form-fit, force-fit and/or material coupling. The guide part 40 and the base 22 may be made of different plastic materials; for example the base 22 may be made of polycarbonate (PC) or a polycarbonate/acrylonitrile-butadiene-styrene (PC/ABS) mixture, while the guide part may be made of polyoxymethylene (POM), so as to ensure less friction with respect to the cable. In the example shown in FIGS. 1 to 5, the guide part 40 is welded to the base 22, for example by means of ultrasound or friction welding (example of a material coupling). In the example shown in these figures, the weld W between the guide part and guide mounting portion involves the surface of the guide mounting portion situated on the opposite side to the surface where the cables are housed, and a corresponding surface of the guide part. In the example shown in FIGS. 6 and 7, the guide part 40 is instead fixed to the base by means of a ratchet (example of a form-fit). In the example shown, a rack 45 is formed on the surface of the guide mounting portion, situated on the opposite side to the surface where the cables are housed; this rack 45 is designed to be engaged by a ratchet portion 47 formed integrally on an inner surface of the guide part 50 situated facing the rack 45.

Irrespective as to the manner in which final fixing is performed between the guide part and the guide mounting portion, positioning of the guide part is performed in the following manner.

The double Bowden cables used in the control assembly of the present invention are produced in accordance with given standards and defined by precise regulations. In particular, one item of data which is supplied by the Bowden cable manufacturers is that relating to the free length of the cable, expressed as the difference L between the length of the cable and the length of the sheath (see FIG. 8). In particular, this data is encoded, being indicated by the last two digits of the bar codes used for labelling the aforementioned cables (at present the length L is expressed by a code ranging between 00 and 15).

A reading device for reading the free length data from the code associated with the specific cable is provided along an assembly line where the Bowden cable is assembled together with the actuator devices of the control assembly. On the basis of this data, a processing and control unit determines the radial assembly position to be attributed to each guide part 40 with respect to the respective mounting portion 37, depending on the nominal torsional load which is to be obtained (by means of a predetermined transfer function). Consequently, the processing and control unit commands a movement and assembly unit so as to move each guide part 40 along the respective mounting portion until it reaches the required radial assembly position. In the case where an adjusting ratchet is arranged between each guide part and the respective guide mounting portion, the (final) radial assembly position may be expressed as the number of teeth of the rack 39 of the adjusting ratchet, and the movement of each guide part along the respective mounting portion is performed consequently for a number of clicks depending on the radial assembly position expressed as a number of teeth of the rack of the ratchet gear.

Figure 6:
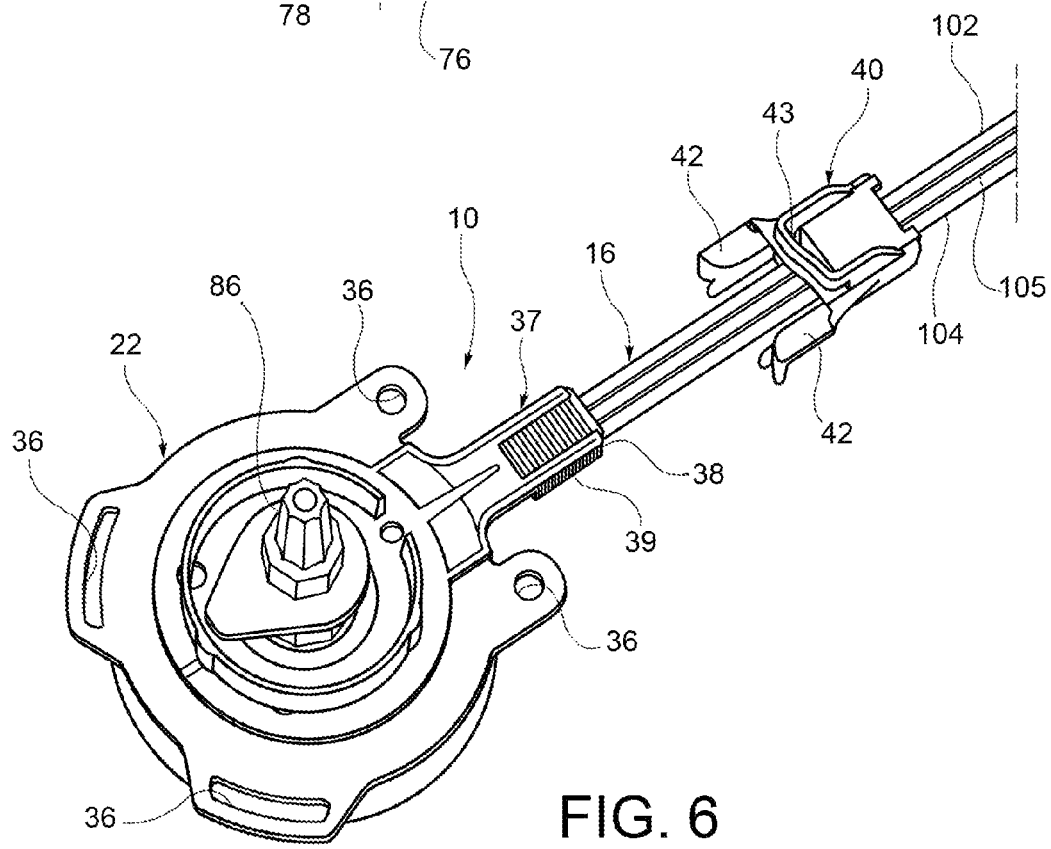
FIG. 6 is a perspective view of a second embodiment of the actuator device, before assembly together with a guide part.
Figure 7:
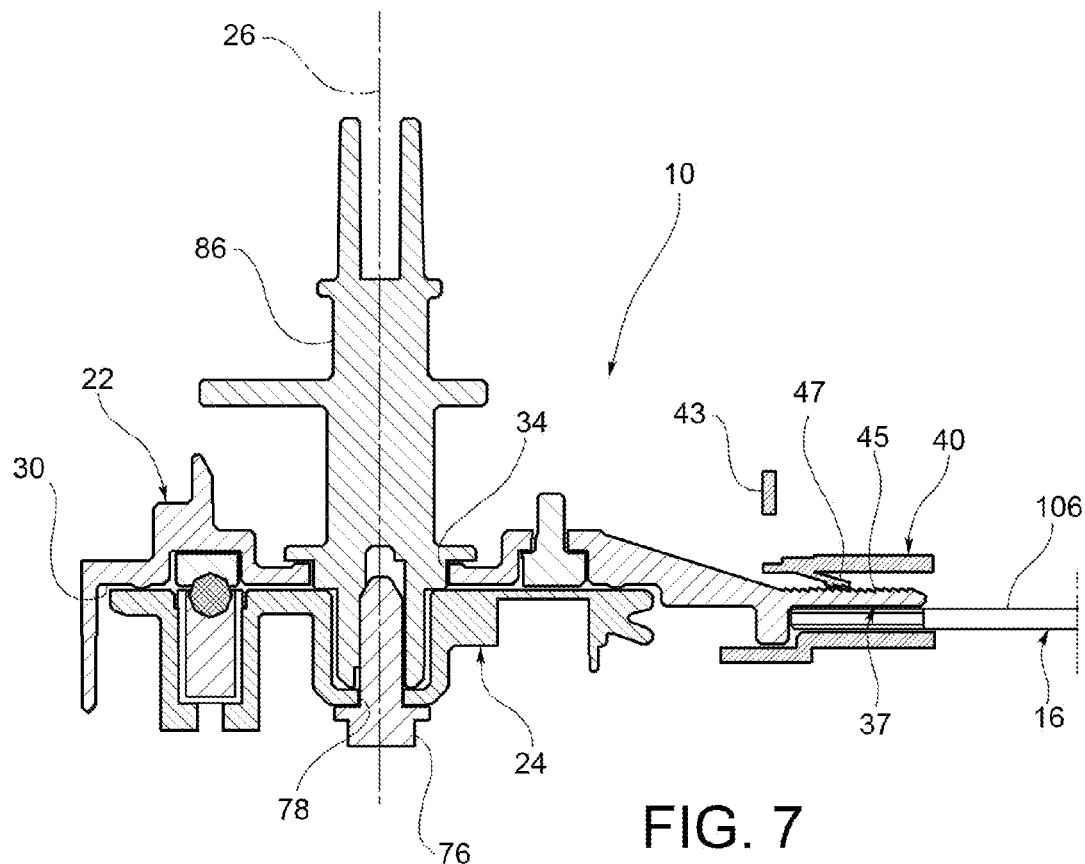
FIG. 7 is a cross-sectional view of the actuator device according to FIG. 6 assembled together with the guide part.

Once reached, the radial assembly position must be permanently maintained. For this purpose, it is possible to envisage an additional fixing operation, for example an operation where the guide part is welded to the respective guide mounting portion (as in the example shown in FIGS. 1 to 5). In the example of FIGS. 6 and 7, this fixing operation instead is not required, since the locking ratchet consisting of rack 45 and ratchet portion 47 already ensures automatic fixing of the components. In this case, however, the ratchet, or other mechanical locking device, must be provided with dimensions such as to prevent movements of the guide part as a result of the tensile loads which normally exist during normal operation of the control assembly.

With the present invention constant nominal values are ensured (i.e. within a smaller tolerance range compared to conventional devices) for torsional load, hysteresis and cable tension, along with greater safety as regards the risk of the cable coming out of its seat. Moreover, the aforementioned transfer function could be set as a parameter depending on the capacity results associated with the dimensions of the plastic parts, so as to compensate for these additional tolerances of the system. Moreover, with a guaranteed nominal value of the torsional load the influence of the installation path of the flexible transmission on the load itself decreases.

The invention claimed is:

1. A method for adjusting a cable tension in a rotating control assembly with a double cable, wherein said method comprises the following steps:
providing a first and a second actuator device both having a respective rotating pulley and being connected together by two cables both fixed to the pulley of the first actuator device and to the pulley of the second actuator device, wherein the pulley of the first actuator device and the pulley of the second actuator device are identical to each other, each of said pulleys being mounted on a respective base, and wherein each base comprises a guide mounting portion extending from the base in a radial direction with respect to an axis of rotation of the pulley; and
positioning, on each guide mounting portion, a respective guide part having a pair of resilient wings, in such a way that said resilient wings press on respective sections of the cables next to areas where the cables are wound onto the respective pulley, a final position of each guide part with respect to the respective guide mounting portion being fixed by means of a form-fit, force-fit and/or material coupling,
wherein said step of positioning the respective guide part on each guide mounting portion comprises the following steps:
reading free length data relating to said pair of cables and indicating a length difference between said cables and respective sheaths,
determining a radial assembly position of each guide part with respect to the respective guide mounting portion, depending on said free length data; and
moving each guide part along the respective guide mounting portion so as to reach said radial assembly position,
said method being characterized in that said step of reading free length data involves reading an identification code associated with said pair of cables and containing the free length data in coded form, and said step of determining the radial assembly position of each guide part is based on a transfer function which associates with said free length data in coded form corresponding values of the radial assembly position of each guide part.

2. The method according to claim 1, wherein an adjusting ratchet is arranged between each guide part and the respective guide mounting portion for defining a plurality of radial positions of the guide part with respect to the guide mounting portion, wherein said radial assembly position is expressed as a number of teeth of a rack of the adjusting ratchet, and wherein the movement of each guide part along the respective guide mounting portion is performed for a number of clicks depending on the radial assembly position expressed as the number of teeth of the rack of the adjusting ratchet.

* * * * *